United States Patent
Burch et al.

[11] 3,782,186
[45] Jan. 1, 1974

[54] MECHANICAL TORQUE SENSOR FOR A HYDROKINETIC TORQUE CONVERTER

[75] Inventors: Daniel G. Burch, Westland; Po-Lung Liang, Livonia; Stanley L. Pierce, Jr., Birmingham; William C. Winn, Inkster, all of Mich.

[73] Assignee: Ford Motor Company, Dearborn, Mich.

[22] Filed: Mar. 15, 1972

[21] Appl. No.: 234,740

[52] U.S. Cl. ............................................. 73/136 R
[51] Int. Cl. ............................................. G01l 3/14
[58] Field of Search .................. 73/136 R, 134, 140

[56] References Cited
UNITED STATES PATENTS

| | | | |
|---|---|---|---|
| 2,061,896 | 11/1936 | Chilton | 73/136 R X |
| 2,289,285 | 7/1942 | Chilton | 73/136 R |
| 2,461,001 | 2/1949 | Palen | 73/136 R |
| 2,582,784 | 1/1952 | Lumb et al. | 73/136 R |

Primary Examiner—Charles A. Ruehl
Attorney—Keith L. Zerschling et al.

[57] ABSTRACT

A torque sensor for determining the torque acting on a bladed member of a hydrokinetic torque converter comprising a reaction ring mounted coaxially with respect to the bladed member, inner and outer control rings disposed concentrically with respect to the reaction ring, one of the control rings being connected drivably to the bladed member, the other control ring being connected drivably to a torque delivery shaft, helical grooves formed in one of the control rings and in the adjacent surface of the reaction ring, cam balls registering with the grooves whereby torque delivered through the reaction ring develops an axial thrust component, a fluid pressure reaction piston acting on said reaction ring, the piston and the cooperating annular cylinder defining a pressure chamber and having registering parts that define a flow restricting orifice communicating with a low pressure exhaust passage, the degree of restriction developed by the flow restricting orifice being proportional to the thrust acting on the reaction ring whereby a back pressure related to torque is developed in the cylinder.

10 Claims, 4 Drawing Figures

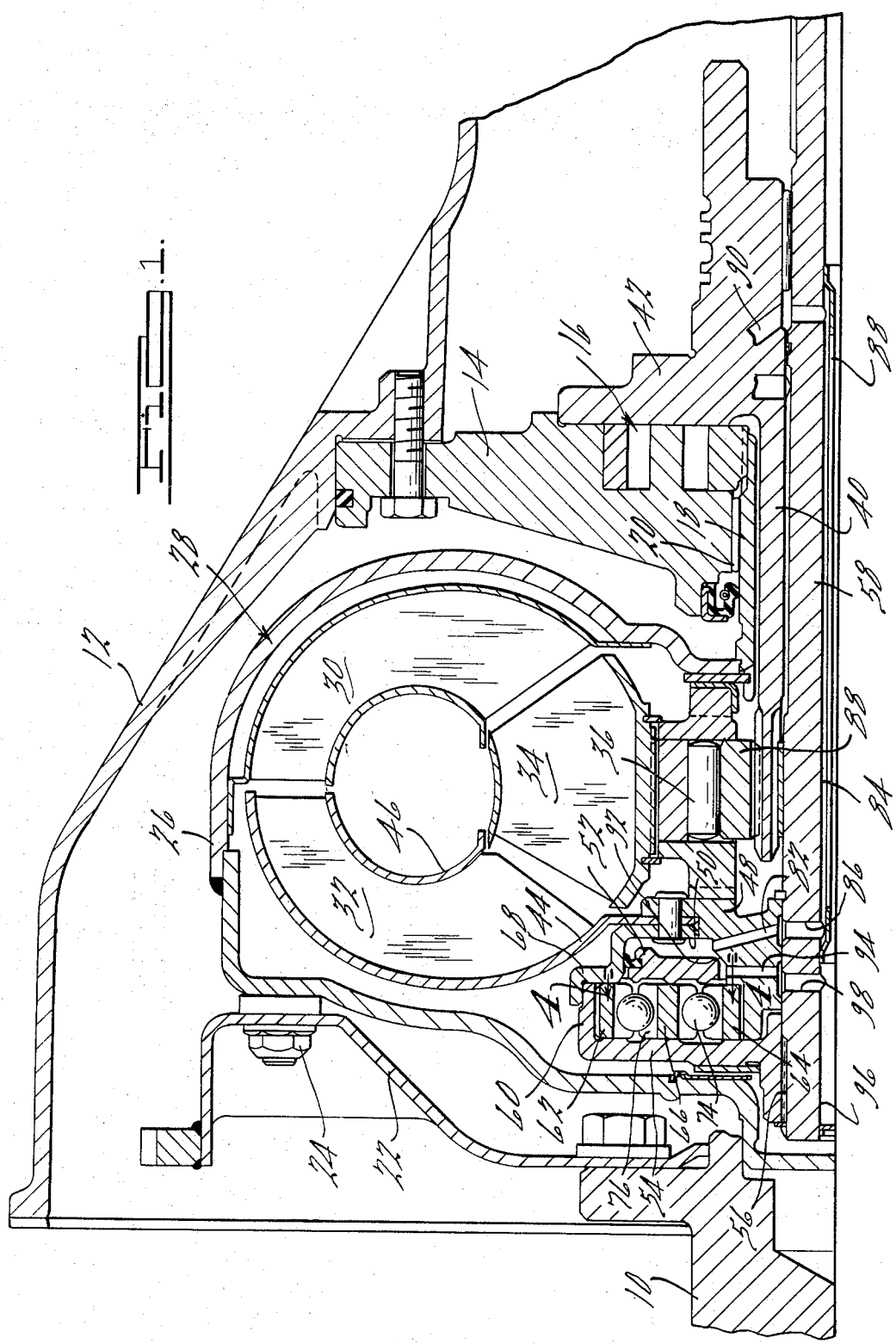

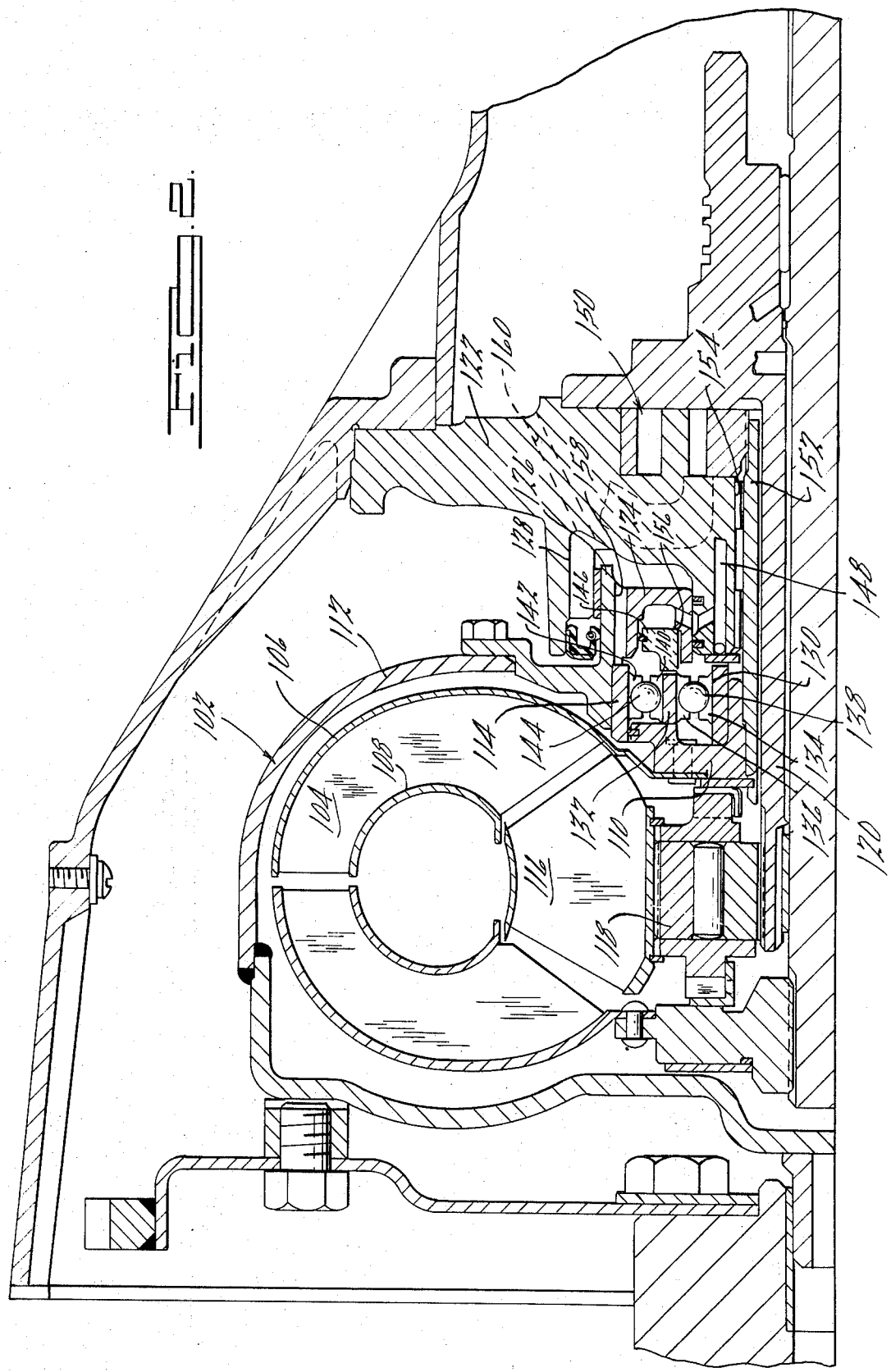

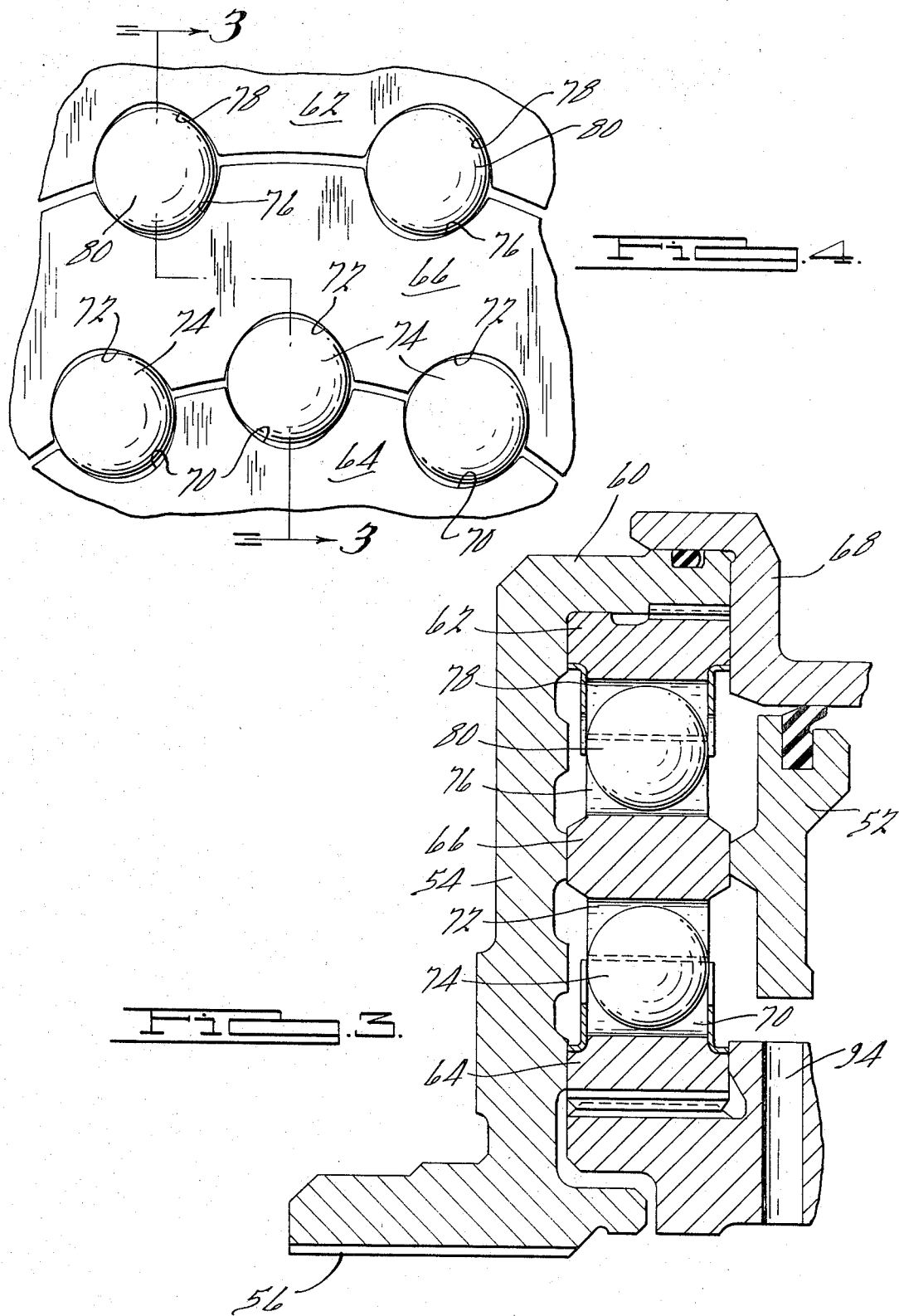

MECHANICAL TORQUE SENSOR FOR A HYDROKINETIC TORQUE CONVERTER

BRIEF DESCRIPTION OF THE INVENTION

The improvements of our invention are adapted to be used in a hydrokinetic torque converter for use in an automatic power transmission mechanism in an automotive vehicle driveline. Most automatic transmissions now used in the automotive industry include a hydrokinetic torque converter having a bladed propeller and a bladed turbine arranged in hydrokinetic fluid-flow relationship. The engine for the vehicle drives the impeller thereby creating toroidal fluid flow circulation that develops the hydrokinetic torque acting on the turbine, which torque is distributed through a turbine shaft to multiple ratio gearing. The gearing normally is controlled by fluid pressure operated clutches and brakes which form a part of a control system. An engine driven pump is used to supply the control system with circuit pressure. The magnitude of the circuit pressure is regulated at a proper calibrated value by a pressure regulator valve that responds to an engine torque signal. When the magnitude of the torque signal increases, the regulator valve responds to provide a higher regulator output pressure for the circuit thereby maintaining a proper torque capacity for the clutches and the brakes. The torque signal source usually is a pressure modulator valve that is actuated by engine intake manifold pressure forces. The higher the engine intake manifold pressure, the higher the torque developed by the engine if the engine is of the internal combustion type with an air-fuel mixture carburetor and intake manifold.

Certain engine intake manifold modifications and changes in carburetion for reducing engine exhaust emissions make the use of engine intake manifold pressure impractical for developing a torque signal that can be used by the automatic transmission. It is an object of our invention, therefore, to provide a means for sensing the torque delivered through the transmission without the necessity for relying upon the engine intake manifold pressure. This is done by developing directly a torque signal that senses the torque acting upon or developed by one of the bladed members of the hydrokinetic torque converter. We have accomplished this by providing a reaction ring situated directly adjacent an annular reaction piston in an annular cylinder.

The cylinder and the piston cooperate to define a reaction pressure cavity that is in communication with the high pressure side of an engine driven pump. A first control ring is disposed within the reaction ring and a second control ring surrounds the reaction ring. Straight axially-directed grooves formed in the inner periphery of the reaction ring and in the outer periphery of the first control ring receive torque transmitting balls which allow torque to be transmitted from the control ring to the reaction ring while accommodating axial displacement of the reaction ring. The outer periphery of the reaction ring and the inner periphery of the second control ring are provided with helical grooves which receive cam balls. The helical grooves and the cam balls cause an axial thrust component to be developed whenever torque is delivered through the reaction ring. One of the control rings is connected to the bladed member and the other control ring is connected to the associated torque delivery shaft for the hydrokinetic torque converter. As torque is transmitted through the bladed member, a thrust component is developed on the reaction ring. This thrust component is opposed by the hydrokinetic fluid pressure force acting on the reaction ring.

The reaction piston and the cooperating cylinder define a flow restricting orifice extending from the annular cylinder to a low pressure exhaust region. As the annular piston is displaced in response to a change in torque delivered through the bladed member, the size of the flow restriction changes thereby increasing or decreasing the back pressure acting on the piston. The back pressure then can be used as an indicator of torque delivered through the bladed member.

The magnitude of the signal developed in this way is directly related to the magnitude of the torque. It does not depend upon the development and the calibration of an intermediate variable such as engine intake manifold pressure.

In a first embodiment of our invention the direct acting torque sensor is arranged to develop a torque signal that is proportional to turbine torque. In a second embodiment the torque sensor is arranged to develop a signal that is proportional to the torque delivered to the impeller of the converter.

BRIEF DESCRIPTION OF THE FIGURES OF THE DRAWINGS

FIG. 1 shows in cross sectional form an assembly view of a hydrokinetic torque converter which includes a torque sensor in combination with a bladed turbine;

FIG. 2 shows in cross sectional form a torque converter assembly with a torque sensor arranged in cooperation with the impeller;

FIG. 3 shows an enlarged view of the torque sensing elements of the embodiment of FIG. 1. It is taken along the plane of section line 3—3 of FIG. 4;

FIG. 4 is a cross sectional view showing an enlargement of the torque sensor of FIG. 1 as seen from the plane of section 4—4 of FIG. 1.

PARTICULAR DESCRIPTION OF THE INVENTION

In FIG. 1, numeral 10 designates one end of a crankshaft of an internal combustion engine. Numeral 12 designates a transmission housing which is adapted to be bolted to the engine block. An internal bearing support wall 14 bolted within the housing 12 forms a housing for a positive displacement pump, which is indicated generally by reference character 16. Pump 16 is connected drivably to impeller driven sleeve shaft 18 which is journalled by bushing 20 within a central opening formed in wall 14.

Crankshaft 10 is bolted to drive plate 22 which is secured by means of bolts 24 to impeller housing 26 for a hydrokinetic torque converter indicated generally by reference character 28. The hub of the impeller housing 26 is secured to the sleeve shaft 18 thereby providing a bearing support for the converter 28.

Converter 28 includes a bladed impeller 30, a bladed turbine 32 and a bladed stator 34. Engine torque delivered to impeller 30 causes fluid circulation in the torus circuit defined by the impeller, the turbine and the stator thereby creating torque which tends to drive the turbine 32 in the direction of rotation of the impeller. The reaction torque acting on the stator 34 tends to act in a direction opposite to the direction of the driving torque. Motion of the stator 34 is prevented by overrunning brake 36, which has an inner race 38 splined to stationary sleeve shaft 40. The shaft in turn forms a part of support 42 which journals clutch and brake structure for the automatic change speed ratio gearing, not shown.

When the converter operates in its fluid coupling mode, the stator 34 freewheels in the same direction of rotation as the impeller, and the overrunning brake 36 overruns during this operating mode.

Turbine 32 includes an outer shroud 44. It cooperates with an inner shroud 46 to define a toroidal fluid flow path. Turbine blades are situated between the shrouds 44 and 46. The hub of the shroud 44 is riveted to hub member 48 which defines an annular cylinder 50. Annular piston 52 is received within the cylinder 50 and cooperates therewith to define a reaction pressure chamber.

The drive member 54 is splined at 56 to turbine shaft 58. It extends radially outwardly and includes a peripheral portion 60, which is splined to a first control ring 62. A second control ring 64 is splined to the turbine hub 48. A reaction ring 66 is situated between the control rings 62 and 64. The rings 62, 64 and 66 are arranged in concentric, coaxial disposition about the axis of the converter 28. Pilot member 68 is riveted to the hub 48 and overlies the peripheral portion 60 of the member 54. Pilot member 68 is not connected directly to the periphery 60 but is piloted with respect to it.

The outer periphery of the second control ring 64 is formed with a plurality of axially formed grooves as indicated best in FIG. 4. Reference numeral 70 is used to designate the grooves. Groove 70 is uniformly spaced with respect to the adjacent groove 70. The inner periphery of the reaction ring 66 also is formed with axially directed grooves 72. A torque transmitting ball 74 is located in each registering pair of grooves 70 and 72. The balls 74 form driving connections between the control member 64 and the reaction ring 66 as they engage the sides of the grooves 70 and 72 as best indicated in FIG. 4, each groove 70 and 72 having two points of contact with the associated ball 74.

The outer periphery of the reaction ring 66 is formed with a right-hand helical groove 76. Each groove 76 registers with a corresponding helical groove 78 formed in the inner periphery of the control ring 62. The hand and the angular disposition of the grooves 76 and 78 correspond to each other. Cam balls 80 are received within each pair of registering grooves 76 and 78. Each ball 80 contacts the groove 78 with point contact. A corresponding point contact exists between the balls 80 and the grooves 76.

The fluid pressure cavity defined by annular cylinder 50 and the reaction piston 52 is supplied with fluid through passage 82. A centrally disclosed fluid pressure passage 84 communicates with the passage 82 through radial port 86. Passage 84 is defined in part by a tubular insert 88 located in the central opening formed in the turbine shaft 58. The right-hand end of the passage 84 communicates with a pump discharge passage 90 for the positive displacement engine driven pump 16.

The radially inward margin of annular piston 52 registers with a portion of one wall of the annular cylinder 50 to define a flow restricting fluid exhaust path 92. That wall portion is crowned to provide a section of a spherical surface having a geometric center on the centerline of the transmission. This results in an orifice of relatively constant size at 92 regardless of whether the piston 52 is askew or cocked with respect to the hub member 48. The path 92 comprises an annular orifice or opening which extends from the cylinder 50 to exhaust flow passage 94. This passage in turn communicates with central exhaust passage 96 through radial port 98 formed in the turbine shaft 58.

Turbine torque is delivered to the control ring 64. The balls 74 establish a driving connection between the control ring 64 and the reaction ring 66. The cam balls 80 establish a driving connection between the reaction ring 66 and the control ring 62. Because of the helical grooves 76 and 78, the transmission of torque from the reaction ring 66 to the control ring 62 is accompanied by an axial thrust force on the reaction ring 66. This thrust force is opposed by the hydraulic pressure force acting on the reaction piston 52. The thrust force acting on the piston 52 tends to decrease the size of the annular fluid flow path 92. In contrast, the hydraulic force acting on the piston 52 tends to increase the size of the flow path 92. During torque delivery the opposing forces acting on the reaction piston 52 tend to become balanced. An increase in torque delivered by the turbine will tend to result in an increase in the hydraulic force due to the increase in the back pressure that accompanies a decrease in the size of the fluid flow path 92. This back pressure then can be used as an indicator of turbine torque.

The embodiment of FIG. 2 includes a torque sensor that provides a torque signal that is proportional to impeller torque rather than turbine torque in a hydrokinetic torque converter. In FIG. 2 the converter is generally identified by reference character 102. The bladed impeller 104 includes an outer shroud 106 and an inner shroud 108. Shroud 106 is secured to impeller hub member 110. The impeller drive shell 112 surrounds the outer shroud 106 and is connected drivably to control ring 114.

A bladed stator 116 is mounted by means of an overrunning brake 118 on stationary sleeve shaft 120, which corresponds to the sleeve shaft 40 of the embodiment of FIG. 1.

A bearing support wall 122, which corresponds to wall 14 of the FIG. 1 embodiment, may be secured to the transmission housing. A reaction cylinder 124 forms the hub of impeller drive shell 112. Cylinder 124 includes an annular bearing surface 126, which is journalled within bearing support 128.

Hub 110 for the impeller is drivably connected to control ring 130. A reaction ring 132 is situated between the control rings 130 and 114. The outer periphery of control ring 130 and the inner periphery of reaction ring 132 are formed with axial grooves 134 and 136, respectively. These register with each other and receive torque transmitting balls 138. The outer periphery of the reaction ring 132 and the inner periphery of control ring 114 are formed with helical grooves 140 and 142, respectively. These grooves are of a common angular disposition and have equal helix angles. They register with each other and receive therebetween cam balls 144.

The annular cylinder 124 receives reaction piston 146 which is adapted to engage reaction ring 132. Annular cylinder 124 and piston 146 define a reaction pressure chamber which communicates with the pump discharge passage shown in part at 148. This passage communicates with the high pressure side of positive displacement engine driven pump 150.

Impeller hub 110 is secured to impeller support sleeve shaft 152 which is journalled within a central opening 154 formed in the support wall 122.

An annular flow path 156 is defined by the inner margin of the piston 146 and the adjacent wall of the annular cylinder 124. The hydraulic force acting on the piston 146 tends to oppose the axial thrust component due to the torque applied to the reaction ring 132. A back pressure develops behind the piston 146 due to the fluid flow restriction at passage 156. Fluid passing through passage 156 circulates past the balls 138 and the cam balls 144, through low pressure passage 158 and then through passage 160 which communicates with the transmission sump or with the flow return side of the pump 150. The torque acting on the impeller creates a thrust component that tends to increase the degree of restriction through passage 156, which in turn results in an increase in the back pressure in the reaction cylinder behind piston 146. The magnitude of the back pressure then can be used as an indicator of impeller torque.

Having thus described preferred embodiments of our invention, what we claim and desire to secure by U.S. Letters Patent is:

1. A torque sensor for providing a pressure signal that is proportional to the magnitude of the torque delivered from a driving member to a driven member in a power transmission mechanism comprising an annular cylinder, a reaction piston disposed in said annular cylinder, a reaction ring mounted adjacent said reaction piston about the axis of said driving and driven members, a first control ring mounted within said reaction ring, said driving and driven members being drivably connected respectively to separate ones of said control rings, a second control ring mounted about said reaction ring in generally concentric disposition, a driving torque transmitting connection between one control ring and said reaction ring and a cammed driving connection between the other control ring and said reaction ring whereby torque transferred between said control rings creates an axial thrust component on said reaction ring, the driving connection between said one control ring and said reaction ring being adapted to accommodate axial shifting movement of said reaction ring relative to said one control ring while accommodating torque transfer therebetween, a flow restricting fluid circulation path defined in part by registering portions of said reaction piston and said cylinder whereby the size of that flow path is changed as said reaction piston moves relative to said cylinder, a fluid pressure source, said annular cylinder being in fluid communication with said pressure source whereby back pressure is developed in said cylinder creating a hydraulic force on said reaction piston that opposes the axial thrust component due to torque transmission from said driving member to said driven member.

2. The combination as set forth in claim 1 wherein the cammed connection between said reaction ring and the other control ring comprises a helical groove in the outer periphery of said reaction ring and a registering helical groove in the inner periphery of said other control ring, and cam balls situated in said registering grooves whereby distribution of torque between said reaction ring and said balls effects an axial thrust component on said reaction ring which is opposed by the hydraulic forces on said piston.

3. The combination as set forth in claim 2 wherein the connection between said reaction ring and said one control ring comprises a plurality of axially disposed grooves, the grooves in the reaction ring registering with the grooves in said one control ring, and cam balls situated in the registering grooves whereby torque may be transmitted between said reaction ring and the control rings while accommodating axial displacement of said reaction ring with respect to said control rings.

4. The combination as set forth in claim 1 wherein said registering portion of said cylinder is crowned to form an increment of a generally spherical surface with a center on the axis of said driving and driven members, the fluid flow area of said flow path remains substantially unchanged if said piston should move out of coaxial disposition relative to the axis of said driving and driven members.

5. A torque sonsor for a hydrokinetic torque converter in a power transmission mechanism having bladed impeller and turbine members, said torque sensor comprising a first control ring connected to one of said converter members, another control ring connected to a torque delivery member, a reaction ring disposed concentrically between said control rings, a torque transmitting connection between one control ring and said reaction ring adapted to accommodate torque transfer therebetween while accommodating axial shifting movement of said reaction ring, a cammed connection between said reaction ring and the other control ring whereby an axial thrust component is developed on said reaction ring as torque is transmitted therethrough, an annular cylinder connected to said one converter member and to said first control ring, an annular piston in said cylinder and cooperating therewith to define a reaction pressure chamber, a pressure source, a fluid connection between said pressure source and said reaction pressure chamber, said piston and said cylinder cooperating to define a fluid flow restricting path between said reaction pressure chamber and an exhaust region, said reaction ring being engageable with said piston whereby hydraulic pressure force developed by said back pressure opposes and balances the axial thrust component acting on said reaction ring due to torque transmission therethrough, the magnitude of the back pressure thereby being an indicator of torque.

6. The combination as set forth in claim 5 wherein the cammed connection between said reaction ring and the other control ring comprises a helical groove in the outer periphery of said reaction ring and a registering helical groove in the inner periphery of said other control ring, and cam balls situated in said registering grooves whereby distribution of torque between said reaction ring and said balls effects an axial thrust component on said reaction ring which is opposed by the hydraulic forces on said piston.

7. The combination as set forth in claim 5 wherein said cylinder is crowned at its inner peripheral margin to form an increment of a generally spherical surface with a center on the axis of said converter and torque delivery member, said piston registering with said crowned peripheral margin to form a fluid flow area that remains substantially unchanged if said piston should move out of coaxial disposition relative to the axis of said converter and torque delivery member.

8. A torque sensor for a hydrokinetic power transmission mechanism having a hydrokinetic converter with a bladed impeller adapted to create toroidal fluid flow circulation, a driving member, a first control ring connected to said driving member, a second control ring concentrically disposed within said first control ring and connected drivably to said impeller, a reaction ring disposed between said control rings, a driving connection between said second control ring and said reaction ring whereby torque may be transmitted from said first control ring to said reaction ring while accommodating axial shifting movement of said reaction ring, a driving cam connection between said reaction ring and said first control ring whereby an axial thrust component is developed on said reaction ring as torque is transmitted to said first control ring, an annular cylinder connected to said driving member, an annular piston in said annular cylinder located adjacent said reaction ring in force transmitting relationship therewith, said cylinder and said piston cooperating to define an annular fluid flow restricting passage, a fluid pressure source, said cylinder being in fluid communication with said pressure source, said reaction ring changing the size of said fluid flow restricting path as torque transmitted therethrough changes thereby altering the back pressure in said cylinder, said back pressure thereby being an indicator of torque.

9. The combination as set forth in claim 8 wherein the cammed connection between said reaction ring and the first control ring comprises a helical groove in the outer periphery of said reaction ring and a registering helical groove in the inner periphery of said first control ring and cam balls situated in said registering grooves whereby distribution of torque between said reaction ring and said balls effects an axial thrust component on said reaction ring which is opposed by the hydraulic forces on said piston.

10. The combination as set forth in claim 8 wherein said cylinder is crowned at its inner peripheral margin to form an increment of a generally spherical surface with a center on the axis of said driving and driven members, said piston registering with said crowned peripheral margin to form a fluid flow area that remains substantially unchanged if said piston should move out of coaxial disposition relative to the axis of said driving member and said impeller.

* * * * *